June 30, 1936.  G. K. PARSONS  2,046,207
RACK FOR WASHING MACHINES
Filed April 14, 1931   2 Sheets-Sheet 1
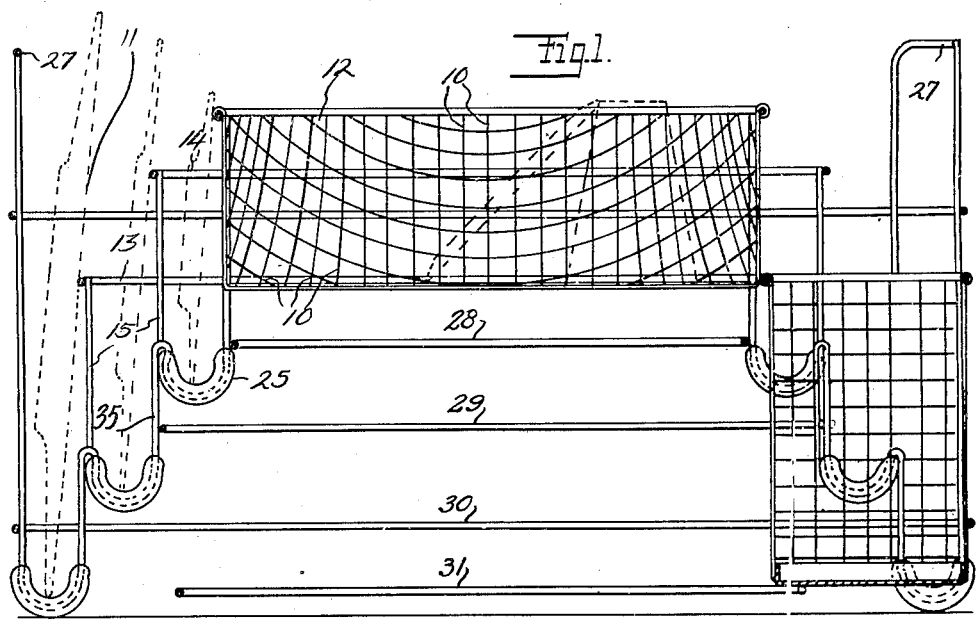
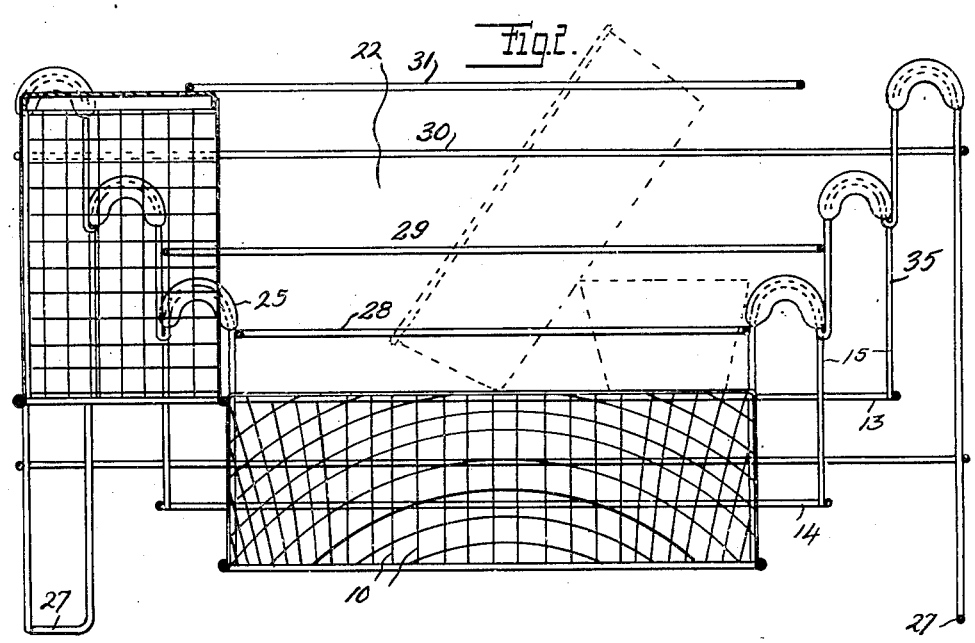
INVENTOR
George K. Parsons
BY Swan & Frye
ATTORNEYS

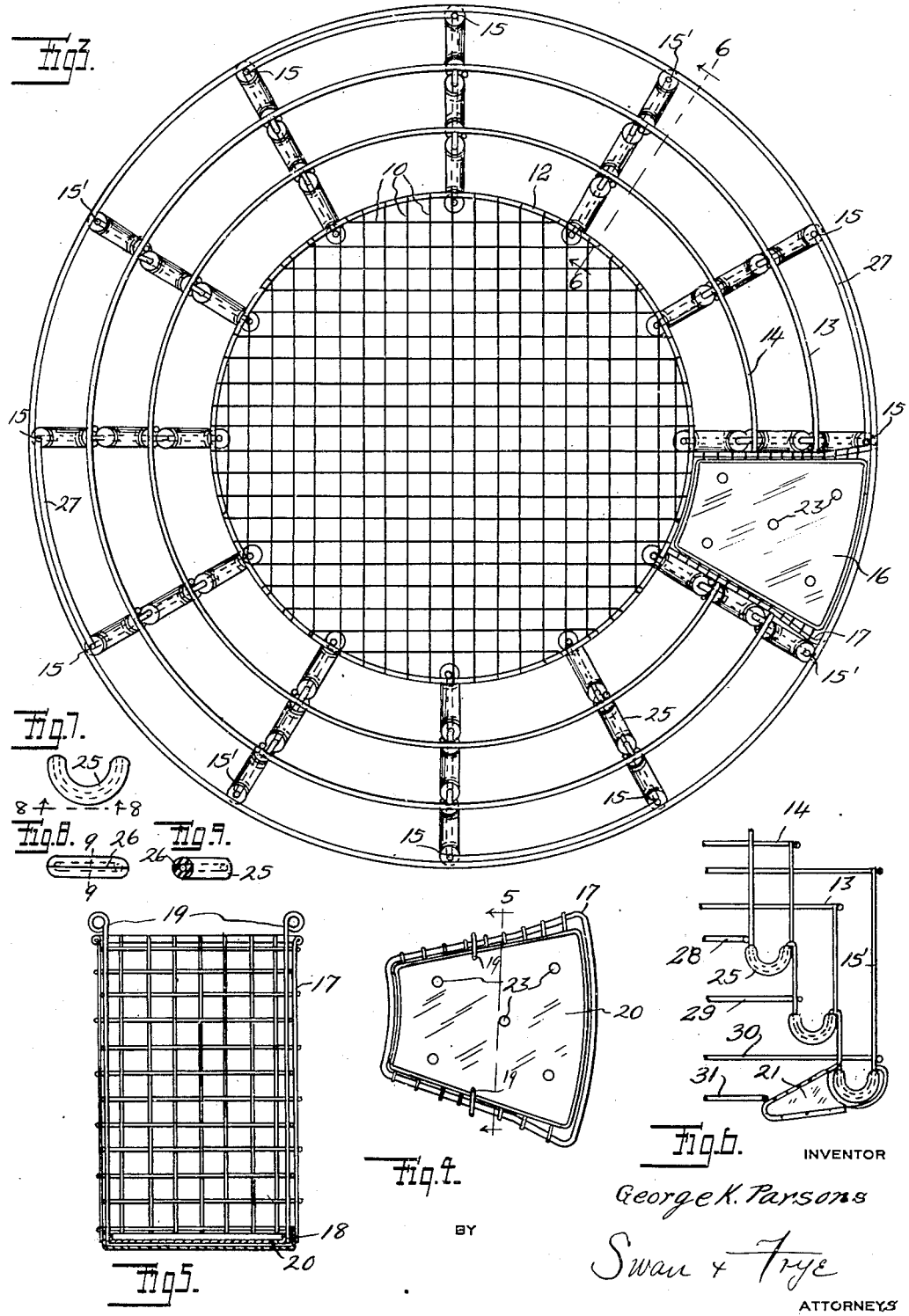

Patented June 30, 1936

2,046,207

UNITED STATES PATENT OFFICE 2,046,207

RACK FOR WASHING MACHINES

George K. Parsons, Detroit, Mich., assignor to Unitor Corporation, Detroit, Mich., a corporation of Michigan Application April 14, 1931, Serial No. 530,119

1 Claim. (Cl. 141—9)

This invention relates to racks for use in dishwashing machines and the like, and has for one of its objects provision of a rack which may be used for supporting relatively small objects, such as dishes, cups, etc., in individual spaced relation, or which may be used for supporting larger objects, such as pots and pans and the like, in a relatively large basket portion, which large basket portion may also be used for containing vegetables, fruit, or the like, which may then be washed in the machine.

It is an object of this invention to provide such a supporting rack which may be reversed in position to thereby furnish racks of different characteristics for supporting objects of different sizes.

Another object of this invention lies in the provision of a novel container for silverware and other small objects which may be supported in a manner enabling efficient washing of its contents by the machine, but from which the contents may be removed with a minimum of difficulty even while hot.

Other objects and advantages will be apparent from the following description, wherein reference is made to the accompanying drawings illustrating a preferred embodiment of my invention, and wherein similar reference numerals designate similar parts throughout the several views.

In the drawings:

Figure 1 is a substantially diametrical but simplified cross section of my improved rack, showing one position in which the same may be used.

Figure 2 is a similar diametrical cross sectional view of my rack in reversed position, in which it may be used for supporting a different class of objects.

Figure 3 is a top plan view of my improved rack, taken when the same is positioned as in Figure 1.

Figure 4 is a top plan view of the receptacle which I preferably employ and incorporate in my rack as a holder for silverware, kitchen tools and the like.

Figure 5 is a vertical sectional view thereof, taken substantially on the line 5—5 of Figure 4.

Figure 6 is a fragmentary cross sectional view taken substantially on the line 6—6 of Figure 3, and looking in the direction of the arrows.

Figure 7 is a plan view of one of the rubber guard members I employ to protect breakable articles against chipping.

Figure 8 is a side view thereof taken looking in the direction of the arrows 8—8 of Figure 7, and Figure 9 is a cross sectional view taken substantially on the line 9—9 of Figure 8.

Referring now to the drawings:

My improved dish rack is intended to be used with dishwashing machines of the type having a substantially cylindrical tub, and an impeller, usually positioned within and near the bottom thereof, for throwing water upon dishes and other objects to be washed, which are supported within the tub upon some form of frame or rack.

I preferably form my rack of wire, contoured as clearly shown in the drawings, crossing and intersecting wires being welded, soldered, or otherwise suitably secured together. After completion, the entire wire assembly is preferably provided with a smooth and sanitary surface, which may be achieved by plating with nickel, or chromium, or in any other suitable manner.

To protect dishes, glassware and the like against chipping I prefer to place rubber guard pieces upon the wire at suitable points. These may be in the form of simple thick-walled tubes of relatively soft rubber, split along one side to enable placing them on the wires after assembly of the rack. The inside diameter of the guard tubing and the strength of the rubber are such that the guard pieces are rigidly positioned when so placed upon the wire. Ordinarily the only breakage danger is that of chipping the edges of dishes which are stood on edge in the rack. Accordingly the only guard pieces which I have found to be necessary are those designated 25, positioned at the bottom curved portion of the dish-supporting parts. The dish-supporting parts will be seen to be three annular reticulated channels extending about the rack and adapted to support dishes when the rack is positioned as shown in Figure 1, in the manner indicated in dotted lines in that view. The guard pieces 25 may be initially curved, and split, as at 26, along the outside curved surface, as shown in more detail in Figures 7, 8, and 9. The guard members will be seen to be additionally secured in their shown positioning by their curvature, which causes them to naturally resist displacement, and by the weight of dishes and the like which rest upon them, which tend to hold them in position. Although fitting tightly enough to prevent the accumulation of dirt between them and the wire, the rubber pieces are easily removable for cleaning or replacement, which latter might in time become necessary due to deterioration of the rubber caused by hot water.

The wires designated 10, Figures 1, 2, and 3, will be seen to provide a platform upon which, when the rack is used in the position shown in Figure 1, tumblers, cups and the like may be placed. The space (designated 12) above the platform formed by the wires 10 thus resembles a relatively shallow basket, surrounding which an annular and deeper space 11 is provided in which dishes and other substantially flat objects may be supported in the manner indicated in dotted lines in Figure 1. The sides and bottom of the basket portion which, together with the space it encloses is generally designated 12, may be formed of woven wire mesh if desired, in the manner shown, and the wires 10 thereof may be extended to form both the sides and bottom integrally. The space 11 may be divided into a plurality of narrower sections by the concentric rings 13 and 14 and the upstanding bracing wires 15 welded or soldered thereto. The wires bounding the upper edge of basket 12 and the wires 13 and 14 will be seen to be arranged in stepped relation at decreasing heights above the bottom of the rack (when viewed as in Figure 1) the bracing wires 35 being looped to form the bottoms of the annular pockets so formed, which carry the guards 25 in similarly stepped fashion, the outermost guards forming feet upon which the rack may stand when so positioned.

As shown in Figure 3 the rings formed by the wires 13 and 14 are broken at one point to form a pocket 16, within which a silverware receptacle 17 may be placed, which is formed as a relatively deep wire basket, as shown in Figures 4 and 5.

To enable easy removal of silverware and the like from basket 17, a lifter 18 with upwardly projecting handles 19 may be inserted in the basket 17, with the vertically slidable platform or tray 20 arranged to substantially cover the bottom thereof. When inserted in a receptacle, silverware and the like rests upon the platform and may be removed by merely lifting the same by means of the handles, which may be looped at their upper extremities as shown. The upwardly projecting handle portions may be arranged to bear outwardly against the sides of the silverware basket (see Figures 4 and 5) to maintain the lifter therein by spring tension, even when the rack is inverted in position. The bottom of the tray 20 is preferably perforated, as at 23, to allow the escape of water.

Certain of the outer vertical bracing wires may be extended upwardly to form convenient lifting handles 27 for the rack, as shown in Figures 1 and 3. These may be formed as continuations of the stepped wires 35 upon whose curved U-shaped stepped portions, or upon guards as 25 placed thereover, dishes are adapted to rest, while their vertically extending portions brace the dish pockets and the basket 12.

Vanes 21, which may be of sheet metal, may be provided to break up the water stream thrown out by the impeller of the machine, to assure the water being cast in all directions and striking all articles contained in the rack with sufficient force. I preferably employ four such vanes positioned at approximately ninety degree intervals, and secured to the wires 15', which are especially looped to the desired contour, as shown in Figure 6.

Adequate radial bracing of the assembly will be seen to be furnished by the wires 10 of basket 12, the radially arranged lowermost looped or guard-carrying portions of the wires 35, and the silverware basket, while the circumferential tying of the annular wires, assisted by the bracing center or core effect provided by the basket 12, results in a very rigid and self-bracing assembly.

The rack may be used in the reversed position, as shown in Figure 2, at which time a larger basket-like space 22 is provided above the platform formed by the wires 10, which may be used, either for pots, pans or other relatively large objects, or for vegetables, fruits, or the like desired to be washed in the machine. The relatively large available space in the basket portion 22 thus constituted will be seen to result from the aforementioned stepped arrangement of the guards 25 forming the bottoms of the annular dish pockets. These may be additionally braced by the annular wires 28, 29 and 30, welded or soldered to the sides of the upright portions of the bracing wires 35, while the lowermost ring (31) as viewed in Figure 1, may be secured to the bottom of the silverware receptacle and to the wires 15' bounding the vanes 21, as shown in Figures 1, 2 and 6.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claim.

What I claim is:

In a dish rack, a relatively small central reticulated dished receptacle, a plurality of reticulated narrow annular receptacles surrounding and concentric with the first and opening in the same direction, another and larger receptacle opening in the opposite direction, and supporting means for holding the mouths of said first mentioned relatively small and surrounding annular receptacles elevated when inverted, whereby upon inversion of the rack different receptacles are available for use, and others are maintained elevated above subjacent articles.

GEORGE K. PARSONS.